Patented Dec. 30, 1947

2,433,784

UNITED STATES PATENT OFFICE 2,433,784

AMINOBIPHENYLSULFONANILIDE

Alexander H. Popkin, Bronx, N. Y., assignor to Sun Chemical Corporation, a corporation of Delaware No Drawing. Application April 12, 1943,
Serial No. 482,755

1 Claim. (Cl. 260—556)

This invention relates to derivatives of biphenyl and methods of preparing same.

One object of the invention is to provide a dyestuff intermediate which is a derivative of biphenyl and which comprises biphenyl in which the radical —$SO_2NHR$, where R represents a radical such as aryl, diaryl, aralkyl or their substituted derivatives, is substituted for hydrogen in one phenyl group, and in which an amino radical is substituted for hydrogen in the other phenyl group in a position ortho to the phenyl group containing —$SO_2NHR$ radical.

Another object of the invention is to provide a product which is a derivative of biphenyl and which comprises biphenyl in which the radical —$SO_2NHR$, where R represents a radical such as aryl, diaryl, aralkyl or their substituted derivatives, is substituted for hydrogen in one phenyl group, and in which a radical hydrolyzable to an amino radical is substituted for hydrogen in the other phenyl group in a position ortho to the phenyl group containing the —$SO_2NHR$ radical.

Another object of the invention is to provide a product which is a derivative of biphenyl and which comprises biphenyl in which the radical —$SO_2NHR$, where R represents a radical such as aryl, diaryl, aralkyl or their substituted derivatives, is substituted for hydrogen in one phenyl group, and in which a radical reducible to an amino radical is substituted for hydrogen in the other phenyl group in a position ortho to the phenyl group containing the —$SO_2NHR$ radical.

Another object of the invention is to provide a product which is a derivative of biphenyl and which comprises biphenyl in which the radical —$SO_2NHR$, where R represents a radical such as aryl, diaryl, aralkyl or their substituted derivatives, is substituted for hydrogen in one phenyl group, and in which a substituted amino radical, such as alkylamino, arylamino, aralkylamino or the like, is substituted for hydrogen in the other phenyl group in a position ortho to the phenyl group containing the —$SO_2NHR$ radical.

Another object of the invention is to provide a dyestuff intermediate which is a derivative of biphenyl and which comprises biphenyl in which the radical —$SO_2NHR$, where R represents a radical such as aryl, diaryl, aralkyl, or their substituted derivatives, is substituted for hydrogen in one phenyl group in a position para to the other phenyl group, and in which an amino radical is substituted for hydrogen in the other phenyl group in a position ortho to the phenyl group containing the —$SO_2NHR$ radical.

Another object of the invention is to provide a product which is a derivative of biphenyl and which comprises biphenyl in which the radical —$SO_2NHR$, where R represents a radical such as aryl, diaryl, aralkyl or their substituted derivatives, is substituted for hydrogen in one phenyl group, and in which a radical hydrolyzable or reducible to an amino radical is substituted for hydrogen in the other phenyl group in a position ortho to the phenyl group containing the —$SO_2NHR$ radical.

Another object of the invention is to provide a product which is a derivative of biphenyl and which comprises biphenyl in which the radical —$SO_2NHR$, where R represents a radical such as aryl, diaryl, aralkyl or their substituted derivatives, is substituted for hydrogen in one phenyl group in a position para to the other phenyl group, and in which a substituted amino radical, such as alkylamino, arylamino, aralkylamino or the like, is substituted for hydrogen in the other phenyl group in a position ortho to the phenyl group containing the —$SO_2NHR$ radical.

Other objects of the invention will be apparent from the following description and appended claim.

I have found in the practicing of the invention, that substituted derivatives of biphenyl which may be classified as substituted sulfonamide derivatives of biphenyl are obtained by inter-reaction as hereinafter described of a substituted organic amine and compounds represented by the general formula:

in which X represents a radical hydrolyzable to to an amino radical, and A represents Cl, Br or I. Also, substituted sulfonamide derivatives of biphenyl can be obtained by interreaction of substituted amines and compounds represented by the general formula:

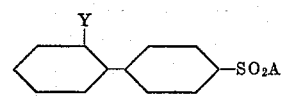

in which Y represents a radical reducible to an amino radical. Preparation of compounds represented by the general formulas:

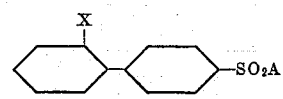

and

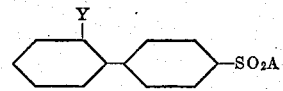

is described in my co-pending application filed on even date herewith. As hereinafter employed in the application, the terms X, Y and A as used have the meaning described.

I have found that when a compound of the general type:

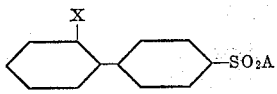

is interacted with a substituted amine, particularly arylamine, aralkylamine, diarylamine and the like, that a series of reaction products are obtained which may be represented in general by the formula:

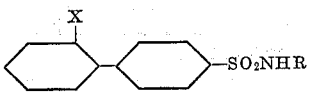

where R represents a radical such as aryl, diaryl, aralkyl and their substituted derivatives—and as used hereinafter in this application is intended to have the same meaning. Such reaction products may be isolated from the reaction mixture, if desired, or may be converted by suitable treatment under hydrolysis reaction condition as hereinafter described to furnish compounds of the general formula:

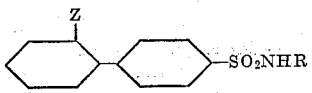

where Z represents an amino radical or a substituted amino radical such as alkylamino, arylamino, aralkylamino, and the like—and such means is intended wherever the term Z is used in this application.

Further, I have discovered that if a compound of the general type:

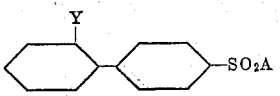

is treated with a substituted amine under suitable reaction conditions as hereinafter described that a compound which may be classified under the general type:

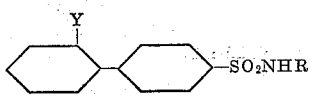

is obtained. Such compound may be isolated from the reaction mixture and obtained in substantially pure form, or may be treated under suitable reduction reaction conditions to obtain a product represented by the general formula:

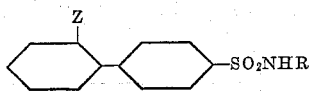

Thus in its practicing, the process of the invention has lead to the production of several new interrelated classes of compounds—such interrelation of the new compounds of the invention arising from the chemical and physical nature and structural relationships of the several classes of compounds and from the methods of preparing such compounds. Such interrelationship is evident from a consideration of the following diagram, which is a schematic representation of the series of reactions of the invention and of the products of the invention:

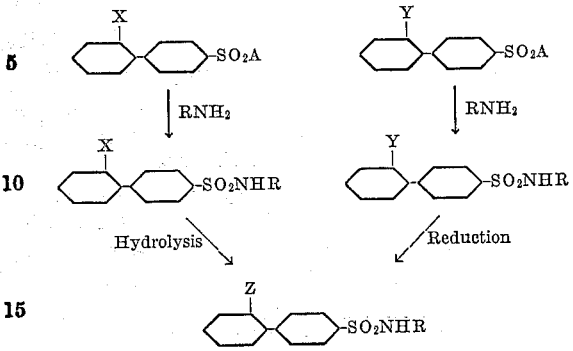

For illustrative purposes, the preparation of several compounds of the invention will be described. In this connection, satisfactory results have been secured, using the methods described hereinafter, which are intended as illustrative. Also, the compound whose preparations are hereinafter described are illustrative of the several classes of new compounds of the invention.

Compounds of the type

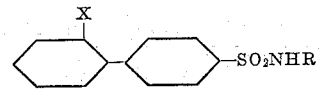

*Example 1.*—A solution containing 5 parts of p-(o-acetamidophenyl)-benzenesulfonyl chloride in approximately 60–70 parts of acetone is admixed with about 5 parts of pyridine and a solution containing 1.52 parts of aniline in about 40–50 parts of acetone. If desired, the materials may be added directly to acetone instead of being first dissolved in separate portions of this solvent. Also, other similar solvents may be utilized when desired. To initiate the reaction, the admixture may be warmed somewhat, and then allowed to stand until the reaction is completed—and with the quantities described above, adequately complete reaction is secured by warming the mixture to 50° C., then removing the source of heat, and allowing the mixture to stand for 12 hours. The rate of the reaction may be accelerated when desired by warming the mixture to a higher temperature, whereby the length of time required for completely adequate reaction is somewhat decreased. At the completion of the reaction period as described, the resulting solution may be concentrated, and suitably this may be done by evaporation, to about one-half of its original volume.

To effect separation of the reaction product from the solvent employed, the solution may be diluted with about 6–7 volumes of water. The material which separates from the water-solvent mixtures may be recovered by any suitable method, as by decantation of the water-solvent mixture. The separated material then may be dissolved in methanol, and the methanol solution admixed with activated charcoal to remove adsorbible impurities, and the desired reaction product crystallized from the methanol solution. The crystallized material then may be separated, as by filtration, and dried. A yield of about 89% of the theoretically obtainable yield of p-(o-acetamidophenyl) - benzenesulfon - N - phenylamide, melting point 163.5–164.5° C. thus is obtained.

*Example 2.*—The procedure is the same as that described in Example 1, and the materials used are also the same as those described in Example 1, with the exception that in place of aniline there is employed 1.75 parts of benzylamine. A yield of 59% of the theoretically obtainable yield of p-(o-acetamidophenyl)-benzenesulfon - N - benzylamide, melting point 127–128° C. thus is obtained.

*Example 3.*—The procedure is the same as that described in Example 1, and the materials used are the same as those in Example 1, with the exception that in place of aniline there is used 2.76 parts of 2-aminobiphenyl. A yield of 86% of the theoretically obtainable yield of p-(o-acetamidophenyl)-benzenesulfon-N-o-xenylamide, melting point 173.5–175.0° C. thus is obtained.

*Example 4.*—The procedure is that as described in Example 1, and the materials are the same as those used in Example 1, with the exception that in place of aniline there is employed 2.76 parts of 4-aminobiphenyl. A yield of 92% of the theoretically obtainable yield of p-(o-acetamidophenyl)-benzenesulfon-N-p-xenylamide, melting point 196.0–196.5° C. thus is obtained.

*Example 5.*—The procedure is the same as that described in Example 1, and the materials employed are the same as those described in Example 1, with the exception that in place of aniline there is employed 2.81 parts of p-aminobenzenesulfonamide. A yield of 78% of the theoretically obtainable yield of $N^4$-[p-(o-acetamidophenyl)-benzenesulfony]-sulfanilamide, melting point 231.5–232.5° C. thus is obtained.

*Example 6.*—The procedure is the same as that described in Example 1, and the materials employed are the same as those described in Example 1, with the exception that in place of aniline there is used 4.05 parts of p-(o-aminophenyl)-benzenesulfonamide. 2-[p-(o-acetamidophenyl)-benzenesulfonamido]-biphenyl-4'-sulfonamide thus is obtained.

Compounds of the type

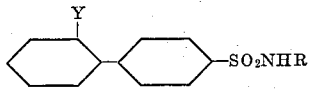

*Example 7.*—A solution of 4.8 parts of p-(o-nitrophenyl)-benzenesulfonyl chloride in about 40–50 parts of acetone is admixed with 5 parts of pyridine and a solution of 1.52 parts of aniline in about 40–50 parts of acetone. If desired, the materials may be added directly to acetone without first dissolving them separately in the solvent.

Also, solvents other than acetone may be employed where desired. To initiate the reaction, the admixture may then be heated to about 60° C. or thereabouts, and then allowed to stand for a period sufficient to insure completion of the reaction. With materials and quantities described above sufficiently complete reaction is secured by heating the mixture to 60° C., then removing the source of heat, and allowing the material to stand for about 16 hours. If desired the reaction period may be shortened by initially heating the mixture to a somewhat higher temperature, or by maintaining the mixture in a heated condition at a temperature substantially above that of room temperature.

To effect separation of the reaction product from the solution prepared as described, the solution may be diluted by adding thereto about 4–6 volumes of water. The product which separates from the water-solvent mixture is removed, suitably by decantation, and washed several times with water to insure removal of water soluble impurities. The washed material then may be dissolved in methanol, the methanol solution treated with activated charcoal to remove adsorbible impurities, and the charcoal separated from the methanol solution and the purified reaction product crystallized from methanol. 95% of the theoretically obtainable yield of p-(o-nitrophenyl) - benzenesulfon - N - phenylamide, melting point 155.5–156.5° C. thus is obtained.

*Example 8.*—The procedure is the same as that described in Example 7, and the materials employed are the same as those of Example 7 with the exception that in the place of aniline there is used 1.75 parts of benzylamine. A yield of 68% of the theoretically obtainable yield of p-(o-nitrophenyl)-benzenesulfon-N-benzylamide, melting point 128.5–130° C. thus is obtained.

*Example 9.*—The procedure is the same as that described in Example 7 and the materials used are the same as those used in Example 7, with the exception that in place of aniline there is employed 2.75 parts of 2-aminobiphenyl. A yield of 85% of theoretically obtainable yield of p-(o-nitrophenyl)-benzenesulfon - N - o - xenylamide, melting point 161–162° C. thus is obtained.

*Example 10.*—The procedure is that of Example 7, and the materials used are the same as those of Example 7, with the exception that in place of aniline there is employed 2.75 parts of 4-aminobiphenyl. p-(o-nitrophenyl) - benzenesulfon-N-p-xenylamide, melting point 164–165° C., thus is obtained.

*Example 11.*—The procedure is that of Example 7, and the materials used are the same as those of Example 7, with the exception that in place of aniline there is used 2.81 parts of p-aminobenzenesulfonamide. A yield of 92% of the theoretically obtainable yield of $N^4$-[p-(o-nitrophenyl)-benzenesulfonyl]-sulfanilamide, melting point 239.5–240° C. thus is obtained.

*Example 12.*—The procedure is that of Example 7, and the materials used are the same as those described in Example 7, with the exception that in place of aniline there is employed 4.05 parts of p - (o - aminophenyl) - benzenesulfonamide. A yield of 86% of the theoretically obtainable yield of 2-[p-(o-nitrophenyl)-benzenesulfonamido]-biphenyl-4'-sulfonamide, melting point 173–174° C., thus is obtained.

It has been found, in effecting the reactions illustrated in Examples 1 to 12, that such reactions are adequately complete when carried out under conditions as described when the reaction admixture is alkaline. Thus the reactions are satisfactorily effected, for example, in the presence of a small amount of pyridine. Caustic soda may be employed in place of pyridine, if desired, and it also has been found that utilization of an excess of substituted amine beyond that necessary for complete interaction with the sulfonyl halide compound is adequate to furnish the desired alkaline reaction condition. Other alkaline materials may be used to obtain the desired alkalinity for adequately complete reaction as described.

Compounds of the type

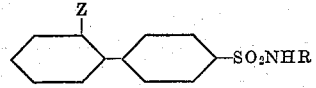

*Example 13.*—p-(o - acetamidophenyl) - benzenesulfon-N-phenylamide, obtained as described in Example 1 may be dissolved in about 25–100 parts of methanol to give a solution containing about 2.5–4.0 parts of amide compound. To the solution then may be added 6.0–18.0 parts of concentrated hydrochloric acid. The mixture then may be heated at its boiling point to effect desired hydrolysis reaction of the amide. To facilitate separation of the hydrolyzed amide, as an amine hydrochloride, about 100–200 parts of water may be incorporated into the mixture. The solid material which thus is separated is isolated from the remainder of the reaction admixture, as by filtration. Treatment of the separated product with alkali, as by caustic soda, then is effected. The treated solid material thus obtained is separated from the caustic soda solution by filtration, the separated product washed several times with water to remove water insoluble materials, and the solid material then dried. To effect further purification of the solid material, it may be dissolved in methanol, the methanol solution admixed with activated charcoal to effect removal of adsorbable impurities, the charcoal removed, and the desired reaction product crystallized from the methanol solution. A yield of 94% of the theoretically obtainable yield of p-(o-aminophenyl)-benzenesulfon-N-phenylamide, melting point 100.0–100.5° C. thus is obtained.

*Example 14.*—The procedure described in Example 13 was employed, using p-(o-acetamidophenyl)-benzenesulfon-N-benzylamide, prepared as described in Example 2. A yield of 92% of the theoretically obtainable yield of p-(o-aminophenyl)-benzenesulfon-N-benzylamide, melting point 106.5–107.0° C. thus is obtained.

*Example 15.*—The procedure described in Example 13 was employed, using p-(o-acetamidophenyl)-benzenesulfon-N-o-xenylamide, prepared as described in Example 3. A yield of 98% of the theoretically obtainable yield of p-(o-aminophenyl)-benzenesulfon-N-o-xenylamide, melting point 165–165.5° C. thus is obtained.

*Example 16.*—The procedure described in Example 13 was used, with p-(o-acetamidophenyl)-benzenesulfon-N-p-xenylamide prepared as described in Example 4. A yield of 98% of the theoretically obtainable yield of p-(o-aminophenyl)-benzenesulfon-N-p-xenylamide, melting point 169–170° C. thus is obtained.

*Example 17.*—The procedure described in Example 13 was employed with $N^4$-[p-(o-acetamidophenyl)-benzenesulfonyl]-sulfanilamide, prepared as described in Example 5. A yield of 87% of the theoretically obtainable yield of $N^4$-[p-(o-aminophenyl)-benzenesulfonyl]-sulfanilamide, melting point 197.2–198.2° C. thus is obtained.

*Example 18.*—The procedure employed is the same as that of Example 13, using 2-[p-(o-acetamidophenyl)-benzenesulfonamido]-biphenyl-4'-sulfonamide, prepared as described in Example 6. A yield of 96% of the theoretically obtainable yield of 2-[p-(o-aminophenyl)-benzenesulfonamido]-biphenyl-4'-sulfonamide thus is obtained.

Where desired, compounds of the general type

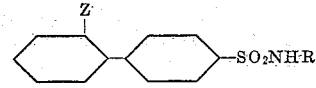

such as are described in Examples 13 to 18 may also be prepared by suitable reaction of compounds of the type

as, for example, those described in Examples 7 to 12. For purposes of illustration, preparation of several compounds by suitable reduction reaction will be described.

*Example 19.*—Approximately 3–5 parts of p-(o-nitrophenyl)-benzenesulfon-N-phenylamide, prepared as described in Example 7 is dissolved in about 100–150 parts of methanol. To the solution are added 3–4.5 parts of tin and 25–30 parts of concentrated hydrochloric acid. The mixture then may be heated to its boiling point and held at that temperature for a sufficient length of time to insure completeness of reaction, and with the materials described above adequately complete reduction reaction is secured when the materials are heated at their boiling point for 3½ hours, after which the source of heat may be removed, and the mixture allowed to stand for about 16 hours. At the completion of this reduction reaction period, the admixture solution is concentrated to a total volume of about 25 parts. The concentrated solution then may be cooled somewhat to effect separation of the reduced reaction product as a hydrochloride. To facilitate separation of the hydrochloride from the reaction mixture, the latter may be treated with about 6 volumes of water. The hydrochloride thus is separated from the water-solvent mixture, and may be removed, as by decantation or by filtration. The separated hydrochloride then is washed with water to remove water soluble impurities. When the washing operation is completed, the hydrochloride may be admixed with caustic soda solution to effect conversion of the hydrochloride to a free amine. The amine thus secured may be separated, as by filtration, washed and dried. To effect further purification of the amine, obtained as described, the latter may be dissolved in methanol, the methanol solution admixed with activated charcoal, the latter removed from the methanol solution, and the amine crystallized from the methanol solution. In this way there is obtained a 98% yield of the theoretically obtainable yield of p-(o-aminophenyl)-benzenesulfon-N-phenylamide, melting point 100.0–100.5° C. This compound is identical with that described in Example 13.

*Example 20.*—The procedure employed is the same as that described in Example 19, using p-(o-nitrophenyl)-benzenesulfon-N-benzylamide, obtained as described in Example 8. A yield of 99% of the theoretically obtainable yield of p-(o-aminophenyl)-benzenesulfon-N-benzylamide, melting point 106.5–107.0° C. thus is obtained. This compound is identical with that secured according to Example 14.

*Example 21.*—The procedure employed is that described in Example 19, using p-(o-nitrophenyl)-benzenesulfon-N-o-xenylamide prepared as described in Example 9. A yield of 98% of the theoretically obtainable yield of p-(o-aminophenyl)-benzenesulfon-N-o-xenylamide, melting point 165–165.5° C. thus is obtained. This compound is identical with that secured as described in Example 15.

*Example 22.*—The procedure employed is that described in Example 19, using p-(o-nitrophenyl)-benzenesulfon-N-p-xenylamide, prepared as described in Example 10. A yield of 97% of the theoretically obtainable yield of p-(o-aminophenyl)-benzenesulfon-N-p-xenylamide, melting point 169–170° C. thus is obtained. This compound is identical with that secured as described in Example 16.

*Example 23.*—The procedure is the same as that described in Example 19, using $N^4$-[p-(o-nitrophenyl)-benzenesulfonyl]-sulfanilamide, prepared as described in Example 11. A yield of 84% of the theoretically obtainable yield of $N^4$-[p-(o-aminophenyl)-benzenesulfonyl] - sulfanilamide, melting point 197.2–198.2° C. thus is obtained. This compound is identical with that prepared according to Example 17.

*Example 24.*—The procedure described in Example 19 was employed, using 2-[p-o-nitrophenyl) - benzenesulfonamido] - biphenyl-4'-sulfonamide, prepared as described in Example 12. A yield of 97% of the theoretically obtainable yield of 2-[p-o-aminophenyl)-benzenesulfonamido]-biphenyl-4'-sulfonamide thus is obtained. This compound is identical with that prepared according to Example 18.

It will be seen that in cases where it is desirable to prepare a compound such as, for example, that described in Example 13, that the methods described in Examples 1 and 13 may be combined, without isolation of an intermediate material to yield the desired compound. Similarly in preparing the compound described in Example 19, the procedure outlined in illustrative Examples 7 and 19 may be combined without isolation of an intermediate nitro compound, such as the product obtained in Example 7 to yield the desired reaction product. Similarly, any of the other products of the invention may be prepared without isolation of intermediates, if desired.

The presence of the radical —SO₂NHR in the compounds of the invention indicates that these compounds may have therapeutic value, especially since such —SO₂NHR groups are present in many organic compounds of important medicinal value. Because of the impossibility of predicting therapeutic importance, such evaluation can be made only after a long series of experimental investigations designed to test such properties. With regards to the compounds of this invention, such tests are not as yet conclusive.

While the products herein described and the methods of producing the same constitute preferred embodiments of the invention, it is to be understood that the invention is not limited to these precise products and methods and that changes may be made therein without departing from the scope of the invention which is defined in the appended claim.

What is claimed is:

The compound p-(o-aminophenyl)-benzenesulfon-N-phenylamide.

ALEXANDER H. POPKIN.

REFERENCES CITED

The following references are of record in the file of this patent:

UNITED STATES PATENTS

| Number | Name | Date |
|---|---|---|
| 2,318,556 | Hentrich | May 4, 1943 |

FOREIGN PATENTS

| Number | Country | Date |
|---|---|---|
| 486,449 | Great Britain | June 2, 1938 |
| 207,672 | Switzerland | Mar. 1, 1940 |
| 207,673 | Switzerland | Mar. 1, 1940 |
| 207,674 | Switzerland | Mar. 1, 1940 |

OTHER REFERENCES

Gabriel, Ber. Deut. Chem., vol. 13, 1880, pp. 1408–1412.

Dorosooy, Journal of General Chemistry (Russia), vol. 9, 1839, pp. 59–64.

Evans et al., Journal Chemical Society (London), 1935, pp. 186–187.

Novelli et al., Jour. Am. Chem. Society, vol. 63, 1941, pp. 854–855.

Van Meter et al., Jour. Am. Chem. Society, vol. 63, 1941, pp. 1330–1331.